United States Patent
Gara et al.

(10) Patent No.: US 8,930,752 B2
(45) Date of Patent: Jan. 6, 2015

(54) SCHEDULER FOR MULTIPROCESSOR SYSTEM SWITCH WITH SELECTIVE PAIRING

(75) Inventors: Alan Gara, Mount Kisco, NY (US); Michael Karl Gschwind, Chappaqua, NY (US); Valentina Salapura, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 13/027,960

(22) Filed: Feb. 15, 2011

(65) Prior Publication Data

US 2012/0210164 A1  Aug. 16, 2012

(51) Int. Cl.
*G06F 11/00* (2006.01)
*G06F 11/16* (2006.01)

(52) U.S. Cl.
CPC ...... *G06F 11/1641* (2013.01); *G06F 2201/845* (2013.01); *G06F 11/165* (2013.01)
USPC .......................................... 714/11

(58) Field of Classification Search
CPC .......... G06F 2201/845; G06F 11/1641; G06F 9/30189; G06F 9/30181; G06F 11/1695
USPC .......................................... 714/11
See application file for complete search history.

(56) References Cited

U.S. PATENT DOCUMENTS

| | | | |
|---|---|---|---|
| 5,388,215 A | 2/1995 | Baker et al. | |
| 5,745,672 A | 4/1998 | Stiffler | |
| 5,751,955 A | 5/1998 | Sonnier et al. | |
| 5,964,835 A | 10/1999 | Fowler et al. | |
| 5,970,226 A | 10/1999 | Hoy et al. | |
| 6,141,770 A | 10/2000 | Fuchs et al. | |
| 6,393,582 B1 | 5/2002 | Klecka et al. | |
| 6,772,368 B2 | 8/2004 | Dhong et al. | |
| 6,862,693 B2 | 3/2005 | Chaudhry et al. | |
| 6,948,092 B2 | 9/2005 | Kondo et al. | |

(Continued)

FOREIGN PATENT DOCUMENTS

| | | |
|---|---|---|
| GB | 2425380 B | 9/2009 |
| JP | 58-056062 | 4/1983 |

(Continued)

OTHER PUBLICATIONS

Office Action dated Jun. 5, 2013, received in a related U.S. Appl. No. 13/027,932.

(Continued)

*Primary Examiner* — Scott Baderman
*Assistant Examiner* — Jigar Patel
(74) *Attorney, Agent, or Firm* — Scully, Scott, Murphy & Presser, P.C.; Daniel P. Morris, Esq.

(57) ABSTRACT

System, method and computer program product for scheduling threads in a multiprocessing system with selective pairing of processor cores for increased processing reliability. A selective pairing facility is provided that selectively connects, i.e., pairs, multiple microprocessor or processor cores to provide one highly reliable thread (or thread group). The method configures the selective pairing facility to use checking provide one highly reliable thread for high-reliability and allocate threads to corresponding processor cores indicating need for hardware checking. The method configures the selective pairing facility to provide multiple independent cores and allocate threads to corresponding processor cores indicating inherent resilience.

16 Claims, 15 Drawing Sheets

(56) References Cited

U.S. PATENT DOCUMENTS

| | | | |
|---|---|---|---|
| 7,058,855 | B2 | 6/2006 | Rohfleisch et al. |
| 7,065,672 | B2 | 6/2006 | Long et al. |
| 7,155,721 | B2 | 12/2006 | Safford et al. |
| 7,287,185 | B2 | 10/2007 | Safford et al. |
| 7,290,169 | B2 | 10/2007 | Safford et al. |
| 7,328,371 | B1 | 2/2008 | Kalyanasundharam et al. |
| 7,343,436 | B2 | 3/2008 | Atago |
| 7,398,419 | B2 | 7/2008 | Safford et al. |
| 7,426,614 | B2 | 9/2008 | Bruckert et al. |
| 7,526,442 | B2 | 4/2009 | Edgar et al. |
| 7,568,063 | B2 | 7/2009 | Gostin et al. |
| 7,613,948 | B2 | 11/2009 | Hillman et al. |
| 7,669,079 | B2 | 2/2010 | Weiberle et al. |
| 7,941,698 | B1 | 5/2011 | Aggarwal et al. |
| 8,051,323 | B2 | 11/2011 | Pathirane et al. |
| 2002/0144177 | A1 | 10/2002 | Kondo et al. |
| 2005/0197718 | A1 | 9/2005 | Shin et al. |
| 2005/0223178 | A1 | 10/2005 | Garcia et al. |
| 2005/0240806 | A1 | 10/2005 | Bruckert et al. |
| 2006/0242645 | A1 | 10/2006 | Codrescu et al. |
| 2007/0061812 | A1 | 3/2007 | Safford et al. |
| 2008/0270660 | A1* | 10/2008 | Weiberle et al. ............ 710/261 |
| 2009/0217135 | A1* | 8/2009 | Busaba et al. ............... 714/768 |
| 2010/0042871 | A1 | 2/2010 | Wendorff et al. |
| 2011/0185125 | A1 | 7/2011 | Jain et al. |

FOREIGN PATENT DOCUMENTS

| | | |
|---|---|---|
| JP | 09-160793 | 6/1997 |
| JP | 2006-058984 | 3/2006 |
| JP | 2009098988 A2 | 9/2013 |

OTHER PUBLICATIONS

Office Action dated May 1, 2013, received in a related U.S. Appl. No. 13/027,882.

Siewiorek, et al., "C.vmp: The Analysis, Architecture and Implementation of a Fault Tolerant Multiprocessor", IP.com, IPCOM000148040D, Original publication date: Dec. 31, 1976, IP.com Eletronic publication date: Mar. 28, 2007, Database entry Copyright (c) Software Patent Institute.

Chiu et al., "A Genetic Algorithm for Reliability-Oriented Task Assignment with k Duplications in Distributed System", IEEE Transactions on Reliability, vol. 55, No. 1, Mar. 2006, pp. 105-117.

Hammond et al., "The Stanford Hydra CMP", IEEE Mar.-Apr. 2000, pp. 71-84.

Hammond et al., "Transactional memory coherence and consistency", Proceedings of the 31st annual International Symposium on Computer Architecture (ISCA), pp. 102-113, 2004.

Herlihy et al., "Transactional memory: Architectural support for lock-free data structures", Proceedings of teh 20th International Symposium on Computer Architecture (ISCA), pp. 289-300, 1993.

Notice of Allowance dated Oct. 18, 2013, received in a related U.S. Appl. No. 13/027,882.

* cited by examiner

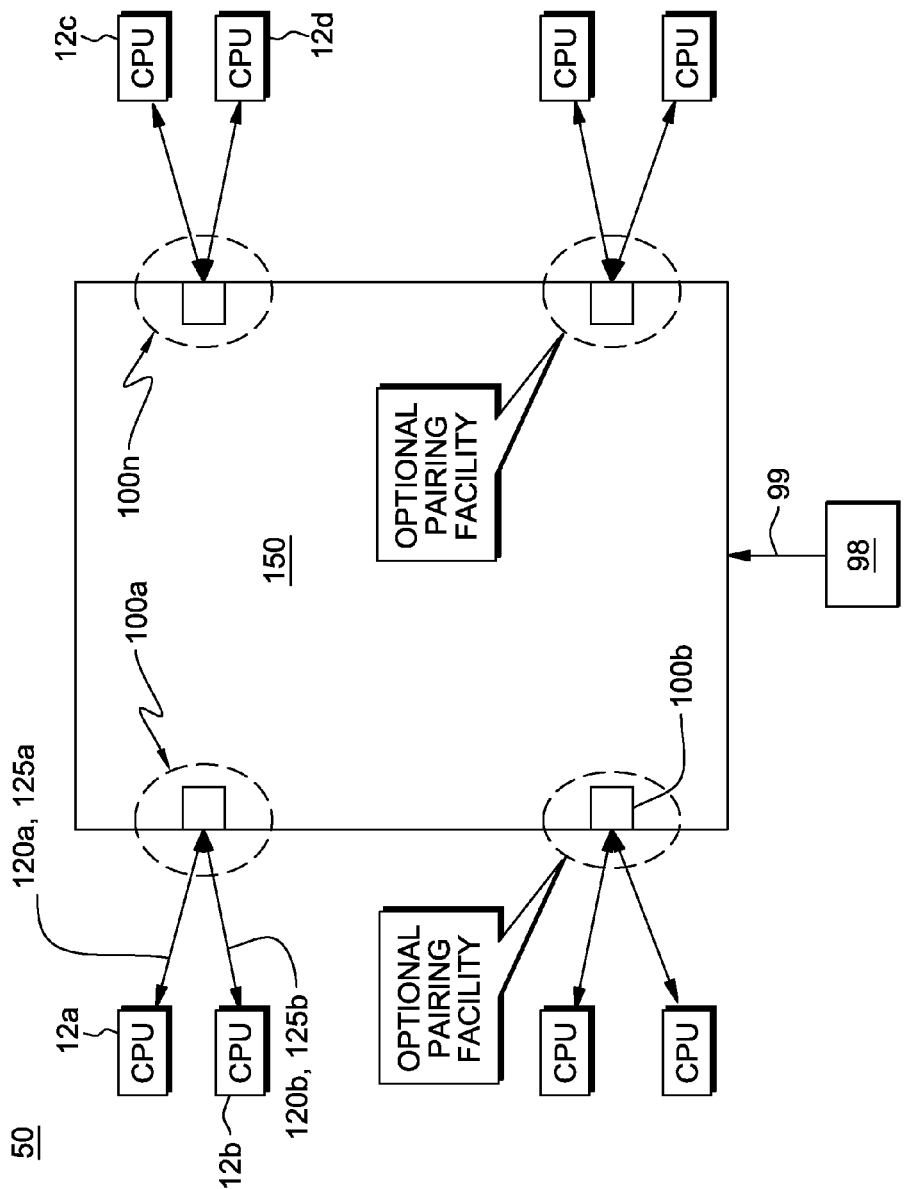

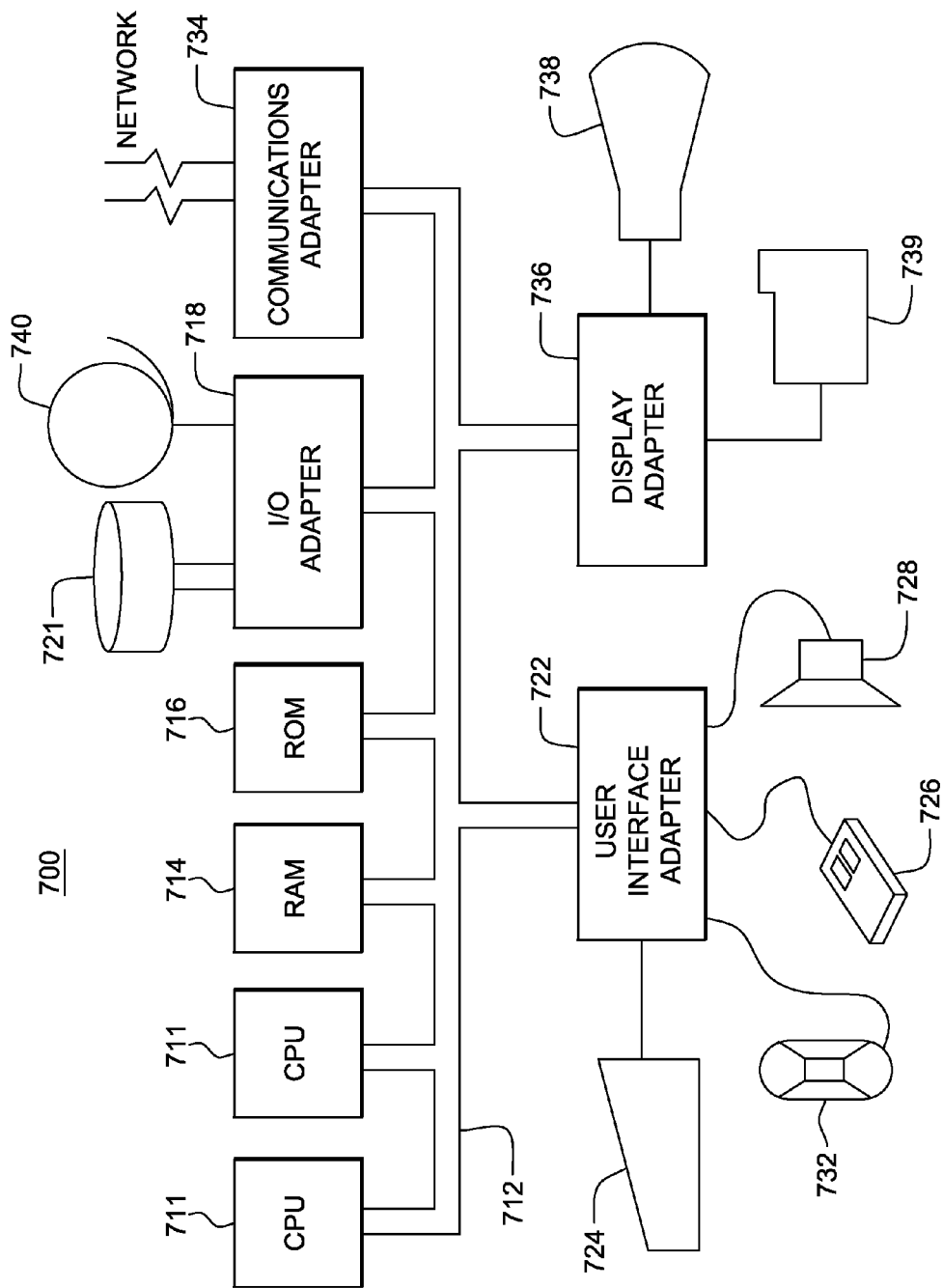

SCHEDULER FOR MULTIPROCESSOR SYSTEM SWITCH WITH SELECTIVE PAIRING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the United States Department of Energy.

CROSS-REFERENCE TO RELATED APPLICATIONS

This disclosure relates to commonly-owned, co-pending U.S. patent application Ser. Nos. 13/027,932 and 13/027,882 filed on even date herewith, and, the entire contents and disclosures of each of which are incorporated by reference as if fully set forth herein.

The present invention relates generally to fault tolerant multi-processor computing systems and particularly to a novel system and method for highly-reliable mode of computing operations. More particularly, there is provided a chip multiprocessor switch with selective processor core pairing and scheduling in order to enable an information handling system to offer both high reliability and high performance operation modes.

BACKGROUND

Some multiprocessor systems exist today that have been designed to offer increased reliability using paired microprocessor cores. An exemplary system is described by Timothy J. Slegel et al. IBM'S S/390 G5 MICROPROCESSOR DESIGN, IEEE MICRO, March 1999, which has been used to achieve industry-leading reliability. However, this prior art design is based on an approach that completely duplicates an I (Instruction) unit and E (Execution) unit of the core. That is, on every clock cycle, signals coming from these units, including instruction results, are cross-compared in a R (Reliability) unit and the L1 cache. If the signals don't match, hardware error recovery is invoked. This checking scheme solves the problems associated with traditional checking, although at an additional cost in die area.

While this design approach has offered high reliability, the duplicated resources were not available even when high reliability was not required. However, some classes of applications offer natural resilience, and it is advantageous to enable systems with higher performance when executing such algorithms. Examples of such algorithms are digital content creation and graphics processing, where deviations from the numerically correct results are not noticed by viewers; and convergence-based algorithms, wherein a corrupted numeric value may increase the runtime, but not impact final result correctness.

Thus, for example, a soft error occurring at a low-order mantissa bit may cause one or two additional iterations to be performed, but making twice the number of cores available to the application will result in an overall speedup.

A single system may be used to execute resilient programs (e.g., financial forecasting and simulation), and those requiring high accuracy (e.g., financial transactions), either simultaneously, or at different times. A single application may also consist of components requiring high reliability, and those being naturally resilient.

FIG. 1 shows a prior art multiprocessor system 10 including multiple processor cores 12a, . . . , 12n (such as embedded on a single chip or system on Chip (SoC) interfaced with system components 15 comprising, for example, memory nest, interrupt controller, etc. Each core 12a, . . . , 12n communicates with system components, e.g., by receiving respective input signals 20a, . . . , 20n, and sending output signals 25a, . . . , 25n.

A prior art multiprocessor system described in U.S. Pat. No. 7,065,672 entitled "Apparatus and methods for fault-tolerant computing using a Switching Fabric" describes a computer system having a switching fabric that communicates transactions asynchronously between data processing elements and a target processor. While this application describes a method for determining correct execution, voting is performed between a plurality of processors, the processors are not to be independently used, and are not shown to be independently usable for lack of switching fabric access. Furthermore, this prior art configuration is dependent upon the features of asynchronous switching networks and the operation of peripheral devices.

Current fault-tolerant systems do not enable both processors to provide independent operation when computational processes are naturally resilient, nor do they enable pairwise execution and checking when they are not.

It would be highly desirable to provide a system and method that provides a pairing facility that enables selective pairing of microprocessors for high reliable (fault-tolerant) implementations under software control, and further enables the scheduling of selected cores for pairing.

It would be further highly desirable to schedule threads such that software-resilient threads execute on throughput-optimized hardware configurations, and threads requiring hardware-resilience ("hardware-resilient threads") executed on reliability-optimized hardware configurations.

SUMMARY

There is provided a system, method and computer program product for scheduling, in a multiprocessing system, selective pairing of processor cores for increased processing reliability. In this aspect, the system includes a scheduler device, and a switch, responsive to signals generated by the scheduler device, to selectively pair to cores to provide one highly reliable thread (or thread group) or independently operate two cores to provide two independent threads (thread groups). Software is provided to schedule a highly reliable thread on the pairable set of cores.

The present invention further provides methods and apparatus for configuring a system to use either paired execution of microprocessor cores wherein a single program is executed twice and results are compared for increased reliability, or to configure such cores as independent cores to offer higher overall system performance.

Accordingly, there is provided a multiprocessing computer system comprising: a memory system including a memory storage device; at least two processor cores in communication with the memory system; a scheduler device generating first and second signals comprising first and second configuration information, respectively, for controlling allocation of processing threads to available processing cores; a pairing sub-system adapted to dynamically configure two of the at least two processor cores for independent parallel operation in response to receipt of the first configuration information signals, the pairing sub-system providing at least two separate signal I/O paths between the memory system and each respective one of the at least two processor cores for the independent parallel operation, the pairing sub-system adapted to pair at least two of the at least two processor cores for fault tolerant operations in response to receipt of the second configuration information signals, the pairing sub-system providing a common signal path for forwarding identical input data to each the paired two processor cores for simultaneous processing thereat; and, decision logic device, in the pairing sub-system, for receiving an output of each the paired two processor devices and comparing respective output results of each, the decision logic device generating error indication upon detection of non-matching output results.

In a further aspect there is provided a method for performing operations in a multiprocessing system comprising a plurality of processor cores in communication with a memory system, the method comprising: dynamically configuring a selective pairing facility to communicate with at least two processor cores for performing one of: independent parallel operation or highly-reliable fault tolerant operations; scheduling, by a scheduler device operatively connected with the selective pairing facility, software-resilient threads to the at least two processor cores when the selective pairing facility is configured for the independent operation of the at least two cores; scheduling, by the scheduler device, hardware-resilient threads to the at least two processor cores connected to the selective pairing facility when the selective pairing facility is configured for the highly-reliable fault tolerant operations, the selective pairing facility providing simultaneous pairwise execution of a thread at paired first and second two processor cores; and, checking execution results generated by the paired first and a second processor cores in order to detect incorrect execution sequences.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which:

FIGS. 3A and 3B depict several pairing facilities 100a, 100b, . . . , 100n configurable within a switching system, which, in one embodiment, includes a crossbar switch 150 as shown in FIG. 3A, or, bus device 175 as shown in FIG. 3B, according to alternate embodiments;

FIG. 11 illustrates an exemplary hardware configuration for implementing the flow charts depicted in FIGS. 6-10 in one embodiment.

DETAILED DESCRIPTION

In one aspect, there is provided a selective pairing facility that selectively connects, i.e., pairs, multiple microprocessor or processor cores to provide one highly reliable thread (or thread group). Each paired microprocessors or processor cores that provide one highly reliable thread for high-reliability connect with a system components such as the "memory nest" (or memory hierarchy), an optional system controller, and optional interrupt controller, optional I/O or peripheral devices, etc. The memory nest is attached to a selective pairing facility via a switch or a bus.

For purposes of description, a thread is understood as a single thread of control, represented by a set of architected processor state resources and including a current instruction address. A thread group is a plurality of threads, each thread represented by a set of architected processor state resources and including a current instruction address. According to one embodiment, using selective pairing on a microprocessor executing a single thread of control will yield a single, more reliable thread. Using selective pairing on a microprocessor executing multiple threads of control (wherein the same threads are replicated on the paired cores) will yield a group of reliable threads that are simultaneously being paired and executed redundantly. Pairing may be used on a group of threads in a multi-threaded core to achieve a reliable multi-threading core.

In one aspect, the apparatus implements a method and computer program product including instructions executed by a host or processor system for configuring two hardware cores as a single highly reliable core using the selective pairing facility, and further, to deconfigure a highly reliable core into two separate cores. Further, the method includes scheduling an application, or a portion thereof, to a highly reliable core responsive to an indication that said application (or application portion) should be executed on a reliable core. Likewise, the method and computer program product including executable instructions may further schedule an application, or portion thereof, to a single unreplicated core responsive to an indication that said application (or application portion) is resilient.

Figure 1:
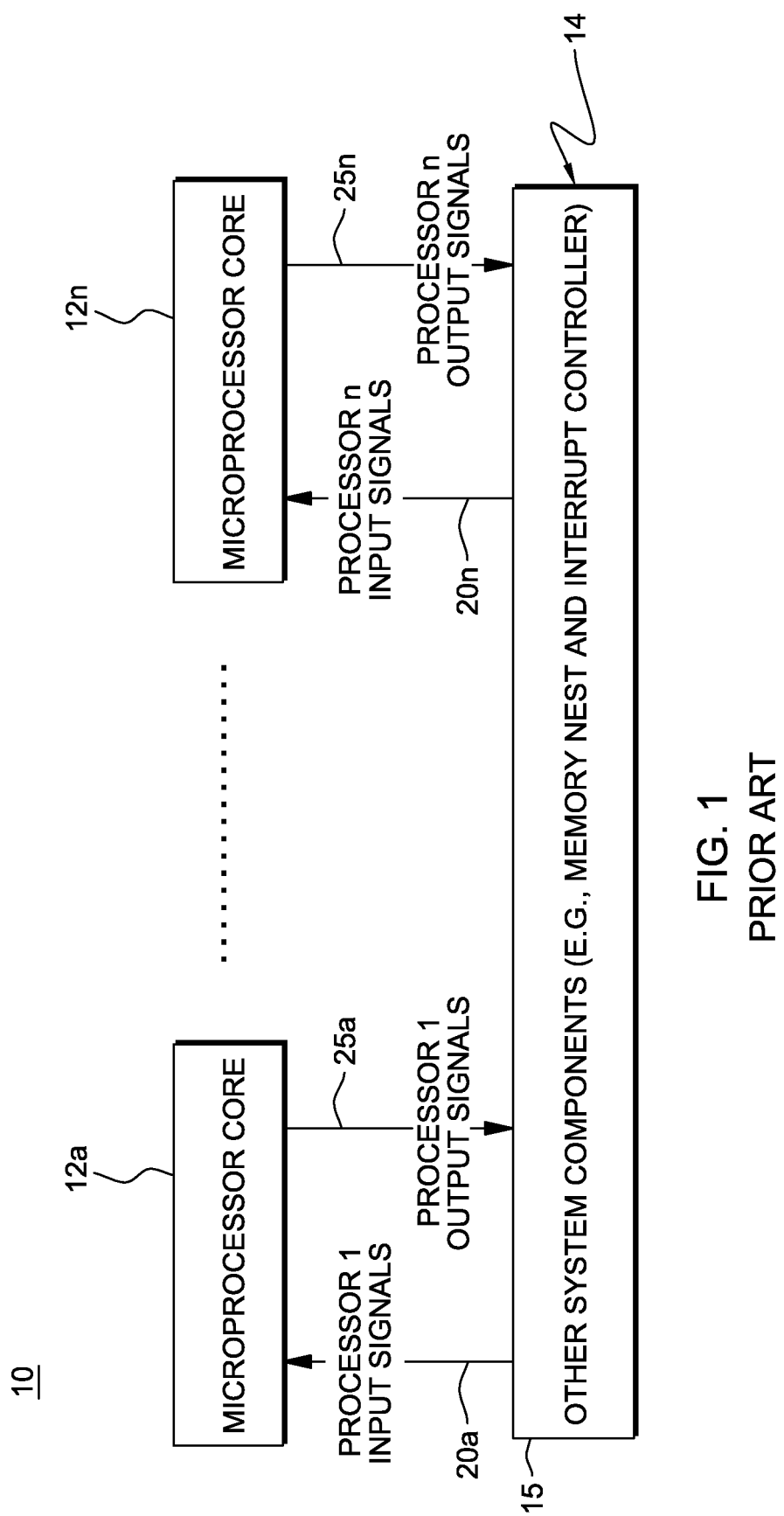
FIG. 1 an example prior art dual processor system interfaced with system components.
Figure 2:
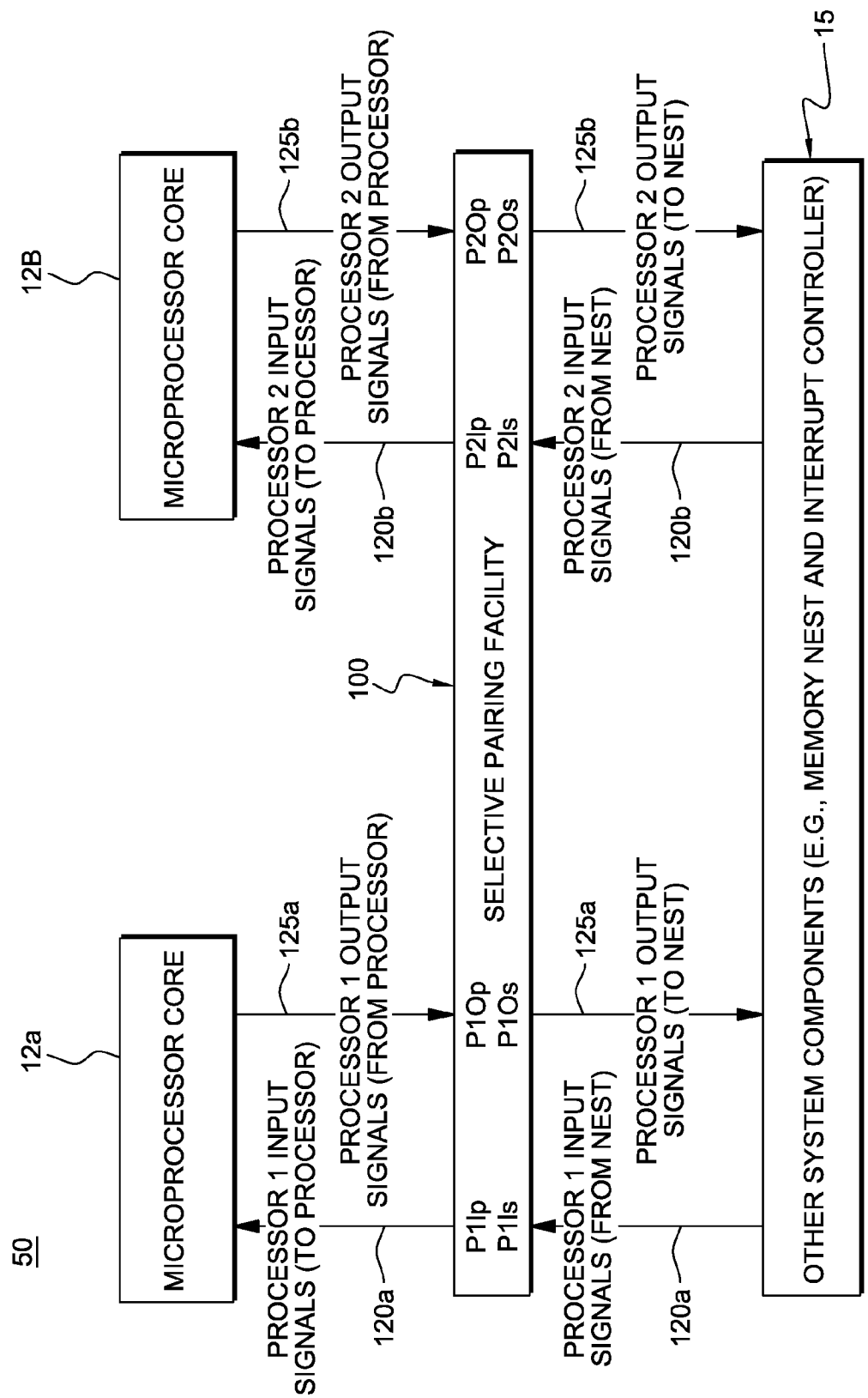
FIG. 2 depicts the system and method for selective pairing of microprocessor cores in accordance with one embodiment.

FIG. 2 depicts the system and method for selective pairing of microprocessor cores in accordance with one embodiment. Particularly, FIG. 2 depicts a highly-reliable computing system 50 that includes a selective pairing facility 100 shown interfaced to and connecting exemplary two processor cores 12a, 12b with a system interconnect 15 to connect to system components such as system memory, e.g., memory "nest". In one embodiment, each core 12a, 12b communicates with the system interconnect 15 via respective input/output signal conductors through the pairing facility 100. For example, input signals are provided over conductor 120a from a system interconnect to a processor core 12a via a configured pairing facility 100 and processor/core output signals are provided over conductor 125a from processor core 12a to the system interconnect 15 via a configured pairing facility 100. Likewise, input signals are provided over conductor 120b from a system interconnect to processor core 12b via a configured pairing facility 100 and processor output signals are provided over conductor 125b from processor core 12b to the system interconnect 15 via a configured pairing facility 100.

In the manner as will be explained in greater detail herein below, the selective pairing facility 100 includes a switching system and intelligence that is embedded or otherwise integrated within a crossbar switch or like switching system, for real-time connecting pairs of microprocessor for highly-reliable operations. In one example, commands for configuring the selective pairing facility for connecting pairs of microprocessor for highly-reliable operations are provided in real-time, during a program execution.

Figure 3B:
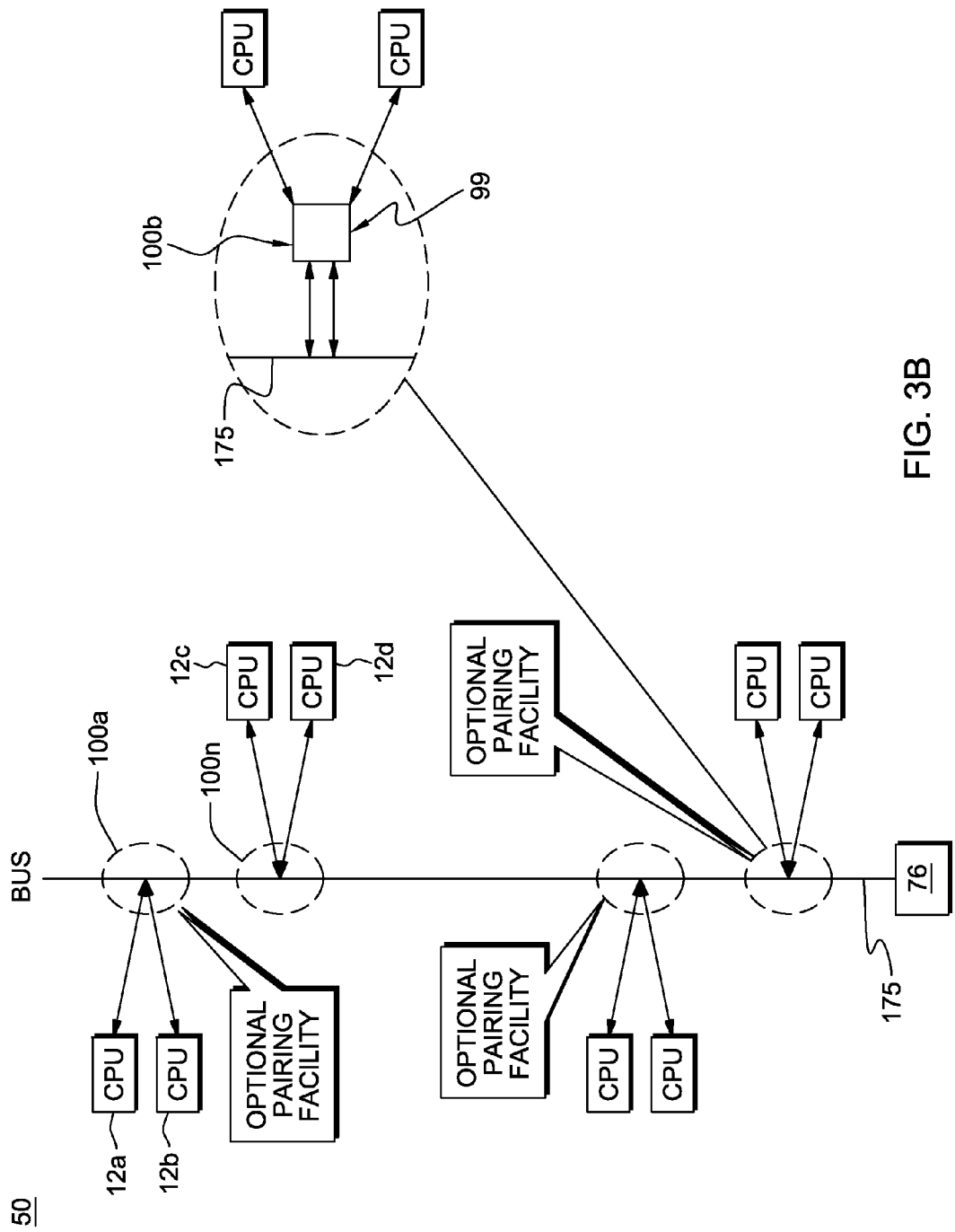

For example, as shown in FIGS. 3A and 3B, several pairing facilities 100a, 100b, . . . , 100n are configurable within a switching system, which, in one embodiment, includes a crossbar switch 150 as shown in FIG. 3A, or, as shown in FIG. 3B, a bus device 175, that enables highly-reliable operations for two or more microprocessor cores that are paired via the pairing facility in response to selective pairing instruction signals 99. Thus, in accordance with one embodiment, responsive to receipt of a selective pairing instruction signal 99 executed via a separately running program application (or application part) or program application running at one of the processor cores to be paired, a selective pairing facility 100a, 100b, . . . , 100n, etc. can be configured for pairing the two processor cores, e.g., to run as a highly-reliable single thread. For example, in FIG. 3A, signal 99, such as a configuration signal generated from an Operating System (O/S), a scheduler 98, user program, control program and/or programmed configuration registers (not shown), initiates the hardware configuration of a pairing facility 100a for pairing, in real-time, example processor cores 12a, 12b within switching system 150 and/or initiates hardware configuration of pairing facility 100n for pairing, in real-time, example processor cores 12c, 12d within switching system 150. Likewise, in the embodiment depicted in FIG. 3B, selective pairing configuration signal 99 may be input to a selected pairing facility, e.g., 100a, to configure a pairing facility 100a within bus switching system 175 for pairing, in real-time, example processor cores 12a, 12b, and a pairing facility 100n for pairing, in real-time, example processor cores 12c, 12d. A single pairing facility 100b shown enlarged within dotted circle in the embodiment depicted in FIG. 3B provides two sets of conductors, one set for interfacing between the cores and the facility and one set for interfacing between the facility and the bus 175 and is shown receiving selective pairing configuration signal 99, e.g., from a scheduler 76. It is understood that one or more pairing facilities 100a, 100b, . . . , 100n for enabling highly-reliable processor core operations is configurable during a single program execution.

Figure 3C:
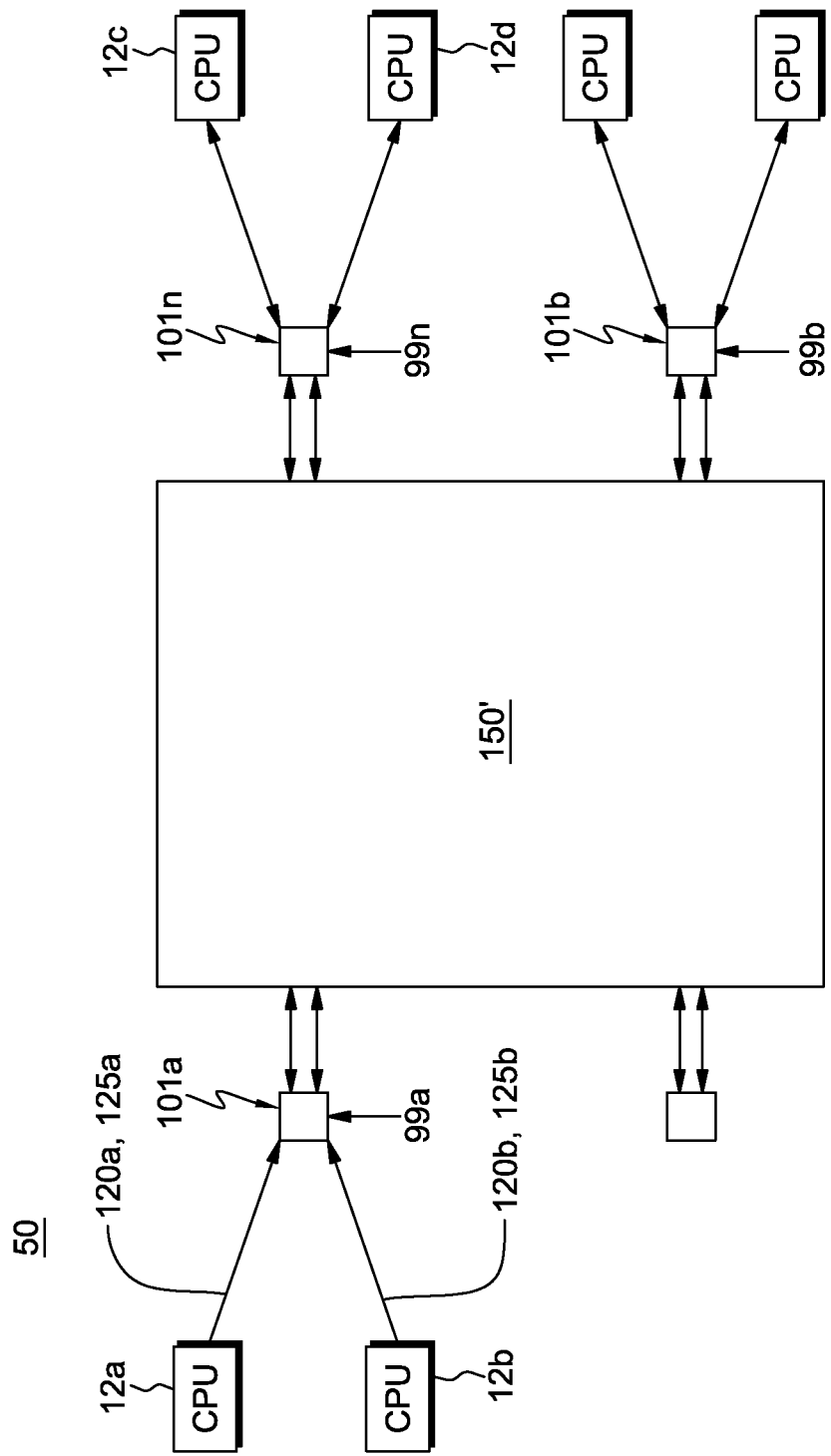
FIG. 3C depicts an alternative embodiment implementing a switch 150' configured to interface with a plurality of external interfacing selective pairing facility hardware modules in one embodiment.

As an alternative embodiment to the embodiment implementing a crossbar switch 150 such as shown in FIG. 3A wherein selective microprocessor pairing is accomplished via facilities 100a, 100b, etc. internal to the switch 150, a crossbar switch 150' such as shown in FIG. 3C, is configured to have a plurality of external interfacing selective pairing facility hardware modules 101a, 101b, . . . , 101n that interface with the switch to receive configuration signals 99 in addition to wired input/output signals from the selected pairs of microprocessors, e.g., 12a, 12b or 12c, 12d, etc. A single pairing facility 101a shown in the embodiment depicted in FIG. 3C includes two sets of conductors 120a, 125a and 120b, 125b, one set for interfacing between each CPU and the facility and one set for interfacing between the facility and the switch 150'.

It is understood that configuration signals 99 received at the selective pairing facilities includes those configuration and control signals such as generated by the operating system (O/S), including signals from a scheduler component 98 (FIG. 3A) and scheduler component 76 (FIG. 3B) for allocating processing threads on a single or paired cores as described herein, and which includes configuration registers populated with data from the user program whether for a single processor core or paired processor cores for running high reliability mode operations. In one embodiment, each pairing facility 101a to 101n in FIG. 3C receives its own configuration signal 99a . . . 99n to be configured independently.

In the embodiments depicted, the system 50 is designed for operation with a variable number of cores 12a, . . . , 12n. Thus, for example, a system with an amount "2n" hardware cores in a design can make available an amount "n" selected pair cores, and 2n cores to be assigned to software. When a system has an amount "n" cores available, all cores have been paired for increased reliability resulting in the software being able to use n highly reliable cores. When a system has 2n cores, and no cores have been paired, this results in 2n cores being available for applications with high performance needs. In a system which has a number of cores between n and 2n cores being available to software corresponds to a system wherein some cores have been made highly reliable to execute applications (or application parts) requiring high reliability, whereas another set of cores is available to execute other applications (or application parts) requiring higher performance and being more inherently reliable.

In another aspect of the present invention, each of the selected microprocessor core pairs, e.g., 12a, 12b or 12c, 12d can be heterogeneous, and are selected to accommodate a particular type of high-reliability processing. Thus, for example, if certain processing speed, registers, check or memory considerations are required, certain processor cores, e.g., 12a, 12b may be the best fit for that calculation, and these processor cores may be paired that are better adapted for handling these particular types of high-reliability processing operations. In one embodiment, the processors which can be paired are fixed, and if reliable processing is needed, but one of the cores is not available, an OS or scheduler intervenes to enable the selected cores to become paired. The configuration signal 99 includes a trigger received at the switch to identify the particular microprocessors known to accommodate a particular type of high-reliability processing and the pairing facility 100 responds by configuring the switch 150, 175 to configure a selected pair facility, e.g., 100a, for handling the requested type of high-reliability (e.g., single thread) processing at the requested microprocessors.

Figure 4A:
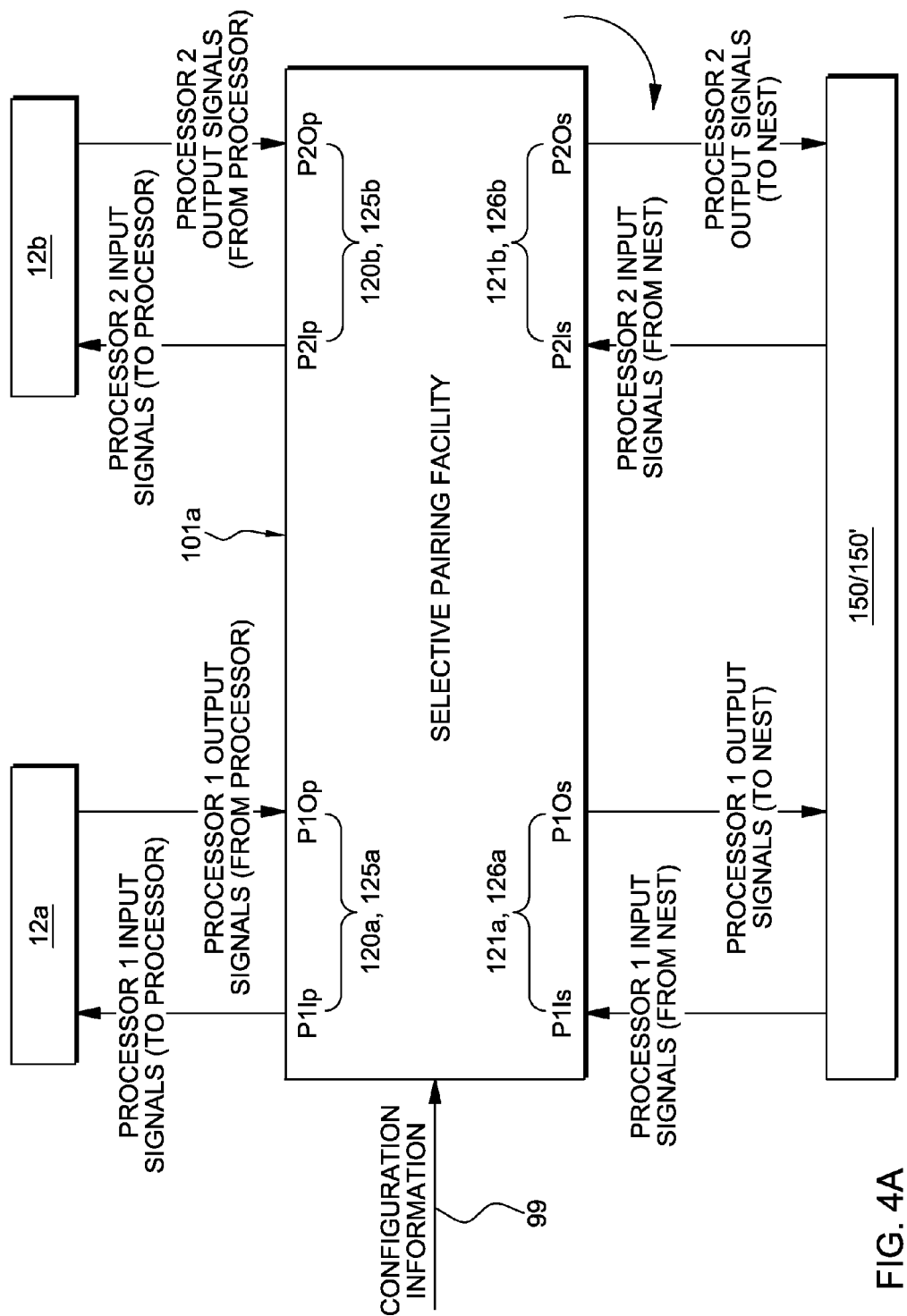
FIG. 4A depicts an example pairing facility 101a connecting to at least two processor cores 12a, 12b.

More particularly, with respect to the configuration of pairing facilities 100a, 100b, etc. shown in FIGS. 3A, 3B or pairing facilities 101a, 101b, etc. shown in FIG. 3C several architectures are embodied. For example, as shown in FIG. 4A, a pairing facility 101a connects to at least two cores 12a, 12b, the pairing facility having as inputs the respective output signals from the respective cores (herein referred to as P1Op and P2Op in FIGS. 4A-4B) that correspond to signals 125a, 125b and are communicated over respective conductors (signal lines) for transmission from a respective microprocessor core to other system components (the "memory nest") via the switch 150/150'. Pairing facility 101a also connects to at least two cores 12a, 12b, the pairing facility having as outputs the respective input signals 120a, 120b to the input signals of the respective cores (herein referred to as processor inputs P1Ip and P2Ip) that correspond to signals being received by a microprocessor core from other system components. In addition, the pairing facility 101a also includes outputs for connection with other system components via the switch 150/150' corresponding to the outputs of the processor cores 126a, 126b (indicated as processor output signals P1Os and P2Os in FIG. 4A), and includes inputs 121a, 121b (indicated as processor input signals P1Is and P2Is) from the other system components via switch 150/150' corresponding to the inputs of processor cores 12a, 12b respectively. In addition, the selective pairing facility has configuration inputs and diagnostic outputs, allowing management of selective pairing.

Figure 4B:
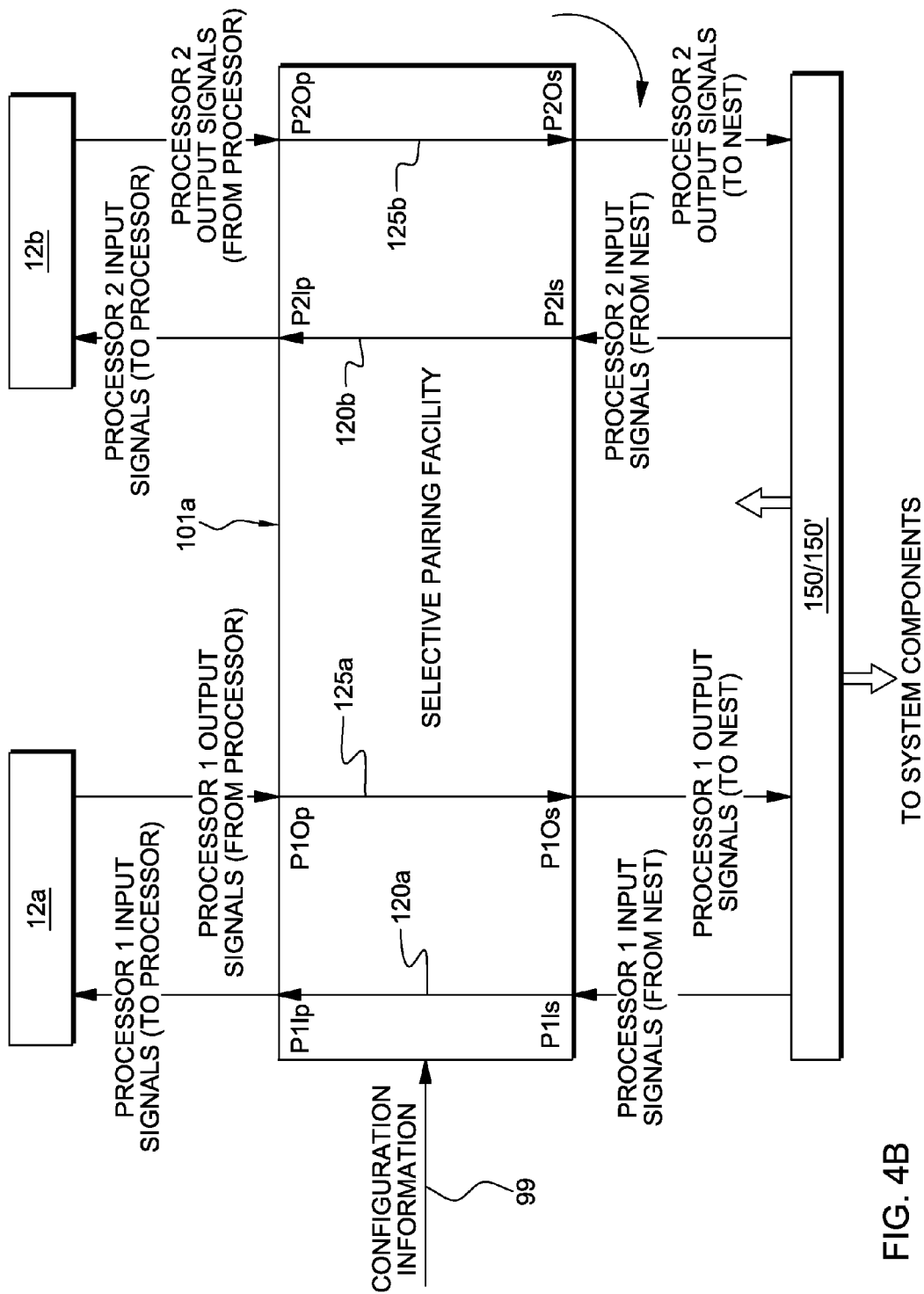
FIG. 4B depicts an example pairing facility 101a connecting to at least two processor cores 12a, 12b wired for individual (non-paired mode of operation)

In one aspect, each pairing facility 100a, 100b, ..., 101a, 101b, etc. has two modes of operation—in a first, high performance mode of operation, depicted in FIG. 4B, the system is configured such as to "pass thru" the signals from both cores. In this first operation mode, the operational paths are to independently connect the inputs of each core, e.g., microprocessor cores 12a, 12b to the corresponding system (e.g., memory nest, I/O controller, etc) interfaces (not shown) via switch 150/150', making both processor cores independently available to software. That is, in response to configuration information 99 such as from an Operating System (O/S), a scheduler, user program, control program and/or programmed configuration registers (not shown) indicating a first mode of operation, the facility 101a, is configured as shown in FIG. 4B for independent processor core operation where processor core 12a communicates with the system components (not shown) via the switch 150/150' via signal line 120a connecting P1Is to processor core input P1Ip, and signal line 125a connecting processor core output P1Op to the system input at P1Os; and, is configured for independent processor core operation as shown in FIG. 4B where processor core 12b communicates with the system components (not shown) via the switch 150/150' via signal line 120b connecting P2Is to processor core input P2Ip, and signal line 125b connecting processor core output P2Op to the system input at P2Os. It is understood that signal lines 120a, 120b and 125a, 125b includes a variety of conductive structures as would be found in a single or multiprocessing system including, but not limited to: a bus which may comprises one or more busses in serial or parallel configurations, e.g., data busses, address busses, a system bus, an I/O bus, and a PCI bus, bus controllers, control signal and interrupt signal lines, etc.

Figure 4C:
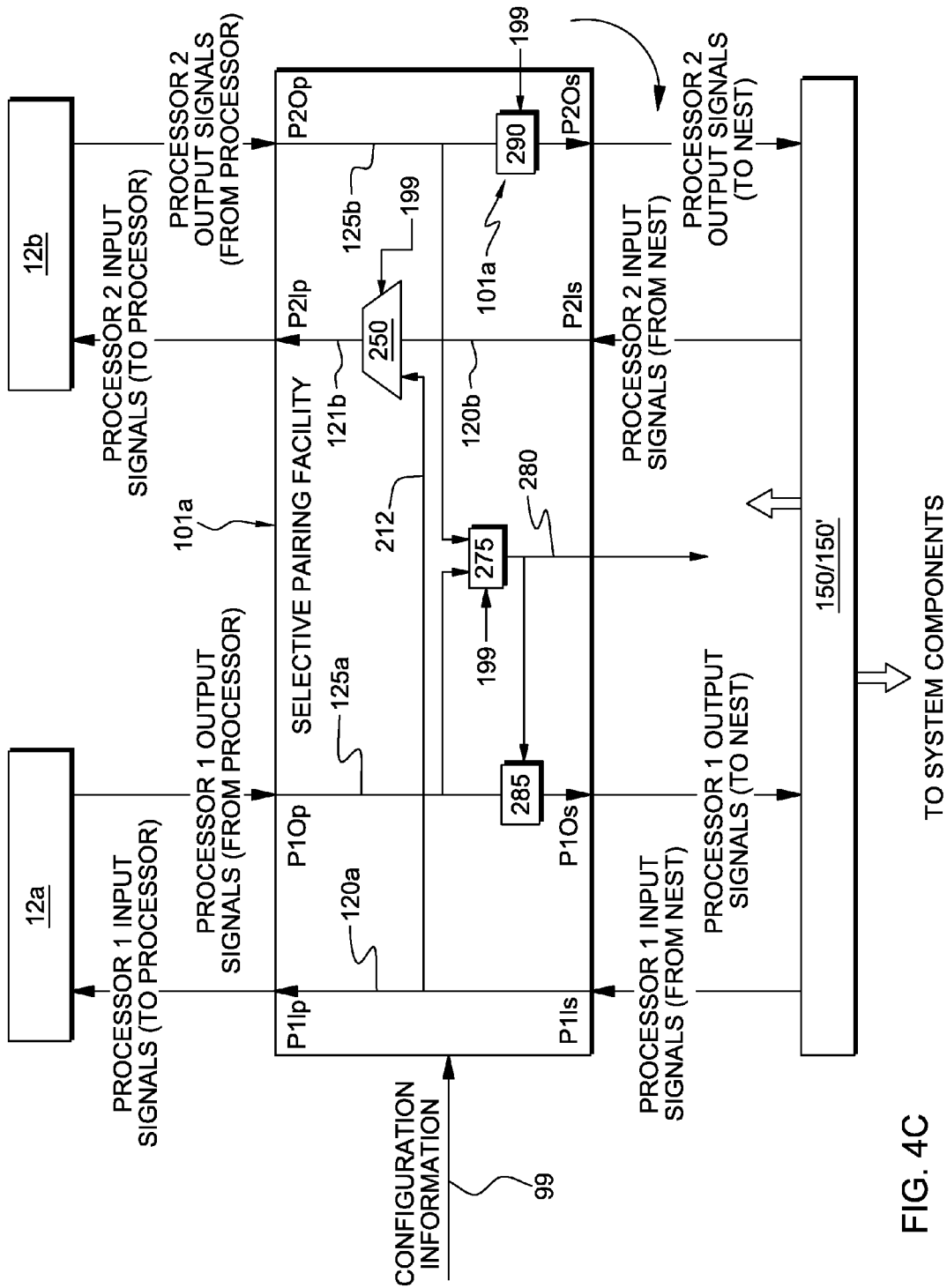
FIG. 4C depicts an example pairing facility 101a connecting at least two processor cores 12a, 12b wired for highly reliable paired mode of operation according to one embodiment.

In the second, high reliability mode of operation, as depicted in FIG. 4C, at least one core 12b is configured to check the execution of its paired core 12a, which connects to the system nest (not shown) via the switch 150/150'. As shown in FIG. 4C, the checker core 12b is not connected to the system components (not shown) via the switch 150/150' in this mode, but rather receives the same inputs as the checked core 12a, and its outputs are compared by comparison logic 275 with the output of the checked core. Thus, as shown in FIG. 4C, via signal line 120a from a system component to a processor core 12a, signals 212 communicated over port P1Is and destined for input to processor core 12a via a configured pairing facility, e.g., 101a, are simultaneously provided as an input to processor core 12b for highly reliable operations. In one embodiment of the paired mode depicted in FIG. 4C, a configuration signal 199 indicating the paired mode of operation, is input to a multiplexor ("Mux") element 250 to configure the mux 250 to receive and select (pass through) only the input signal(s) 212 for input via port P2Ip to the processor/core 12b provided over mux output conductor 121b. Thus, in the paired mode, processor cores 12a and 12b both receive identical input signals carried on signals line 120a and 121b and may comprise one or more address, data, system, control, I/O, instruction or interrupt signals. Further, in the second paired mode of operation, both outputs of each processor core carried on signals lines (busses) 125a, 125b are compared for high-reliable operation. Thus, in the paired mode of operation as shown in the configured pairing facility of FIG. 4C, outputs of the processor 12a via port P1Op and signal line 125a are input to a decision logic device 275, e.g., a comparator; and, likewise, outputs of the processor 12b via port P2Op and signal line 125b are input to a decision logic device 275 that compares the respective processing core outputs. Depending upon the comparison results, an output of the comparator may indicate an error (result mismatch) via signal line 280, or provide an error-free indication, e.g., either by the absence of an error indication on signal line 280, or using an additional distinct signal line.

Further, output enable logic blocks 285 and 290 are provided to control the output signals P1Os and P2Os of respective processor 1 and processor 2 devices to the switch 150/150'. The output enable logic 290 controls and enables the processor output signals P2Op to be transmitted as P2Os signals to the switch 150/150'. The controlling signal is the configuration signal 199 indicating the paired mode of operation. In the paired mode of operation, the signal P2Op is disabled, and not driven to the P2Os signal. Similarly, the output enable logic 285 controls and enables the output signals P1Op to get sent out as P1Os signals to the switch 150/150'. The controlling signal for this output enable logic 285 is the error signal 280 indicating that the results from the paired processors do not match, and that error happened, and no results should be sent into the switch 150/150' to system components.

Those skilled in the art will understand that "not driven" refers to not presenting requests received as signal P2Op as output P2Os, and indicating an absence of requests or transactions. The signaling protocol is dependent upon a specific implementation, and "not driven" may be implemented by a number of signaling means, including driving one or more signals to a high impedance value, or to a value or combination of values representing the absence of requests.

In accordance with the checking facility, the behavior of the pairing function and including the checking facility to implement a configured first mode or second mode of operation of the pairing facility such as configured facility 101a of FIG. 4B may be implemented by the following example VHDL pseudocode as follows where checker is processor 12b and checkee the processor 12a:

```
If (mode = passthru)
    P1Ip <= P1Is;
    P1Os <= P1Op;
```

-continued

```
    P2Ip <= P2Is;
    P2Os <= P2Op;
Else - (mode == paired)
    P1Ip <= P1Is;
    P1Os <= P1Op;
    P2Ip <= P1Is;
    Correct_execution <= (P1Op = P2Op); -- compare output of checker
    and checkee
End if;
```

Those skilled in the art will understand that at one time, more than two (2) cores can be paired, wherein two (2) cores may receive identical inputs as the checkee core and used as checker cores. Further, in one alternate embodiment, when more than two (2) cores are attached to a pairing facility, voting can be used to determine the output when executing in paired mode.

In another aspect, system software is provided that enables a computing machine to perform the function of: 1) configuring two hardware cores as a single highly reliable cores; 2) de-configuring a highly reliable core into two separate cores; 3) scheduling an application, or a portion thereof, to a highly reliable core responsive to an indication that said application (or application portion) should be executed on a reliable core; and 4) scheduling an application, or portion thereof, to a single unreplicated core responsive to an indication that said application (or application portion) is resilient.

Figure 5:
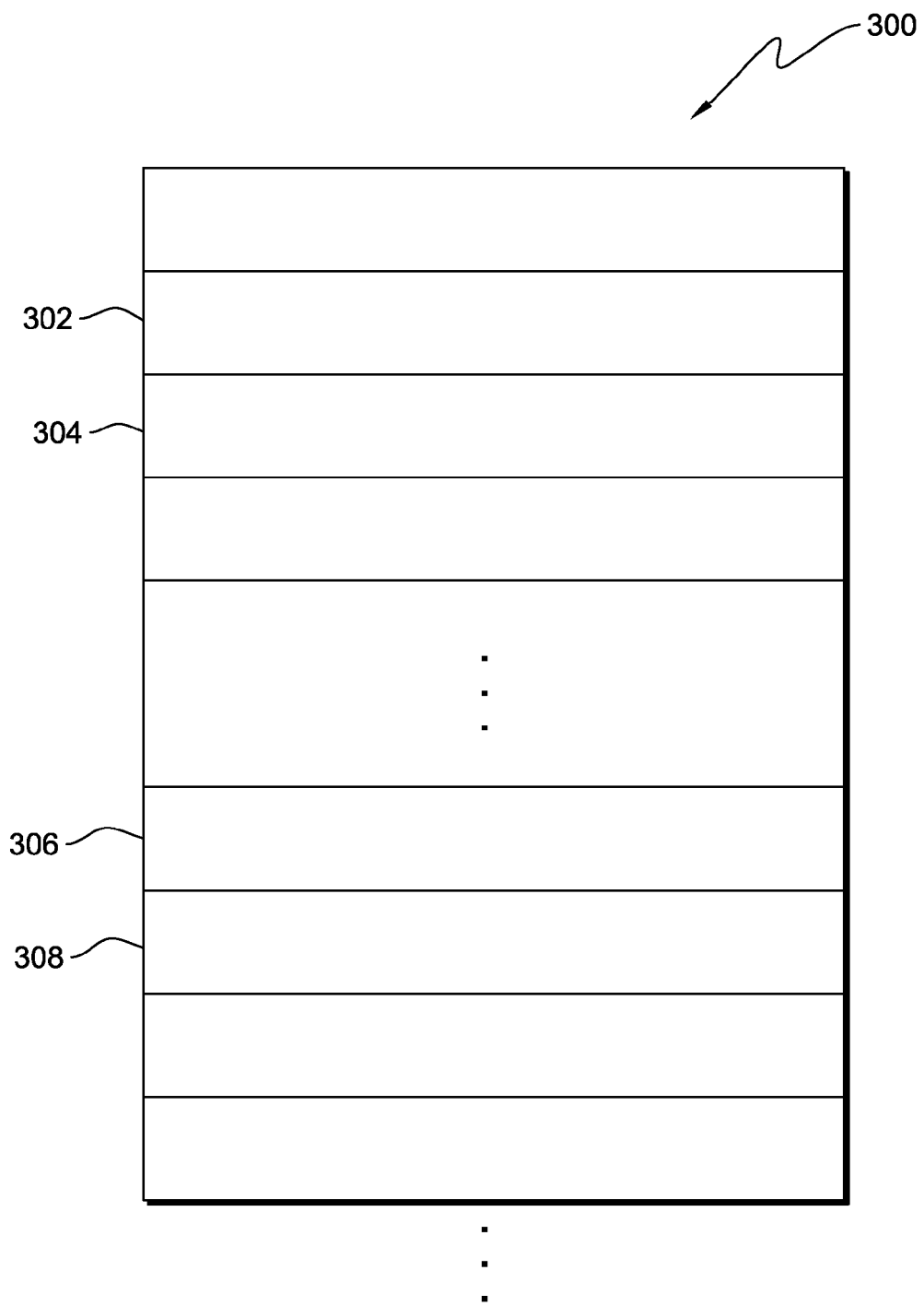
FIG. 5 depicts conceptually an example high performance computing application 300 running on a multiprocessor computing system that employs the selective pairing facility in one embodiment.

FIG. 5 depicts conceptually an example high performance computing application 300 running on a multiprocessor computing system that employs the selective pairing facility in one embodiment. As shown in FIG. 5, in accordance with an exemplary application-configured system, application 300 includes code portions 302, 304, 306, 308. In one embodiment, code portions 304, 308 may include incorporated in the programmed code fault tolerant algorithms that do not require redundant paired cores for high reliability operation. Reliability of the software program is achieved by using a high-reliability algorithm with internal built in checking, for example, by implementing convergence based algorithm. However, within the same program, computing portions 302, 306 may include specific call-outs to configure the system to operate in a high reliability paired mode, i.e., the operating system will implement the switching to pair two processor (hardware) cores as a single highly reliable (virtual) core such that the selected paired cores can run a single thread in the higher reliability mode. In this mode, one processor core will check the results of the other processor core to ensure high reliability. That is, the operating system will populate operation registers at each of the two paired cores for performing the same programmed operations.

Thus, in the exemplary system, a computing application 300 includes a resilient application portion 304, such as, for example, based on an iterative convergence algorithm, and a control and calculation logic portion 302 which is less intrinsically resilient. In such an embodiment, the application 300 executes code section 302 by configuring the system with a first (typically, but not necessarily, smaller) number of threads to perform initialization and initial configuration using paired hardware-resilient cores such as depicted in FIG. 4C. The threads of the application are then synchronized, e.g., using a known barrier synchronization method, as known to those skilled in the art, and after the barrier synchronization, the application portion 304 requests a reconfiguration call-out to deconfigure hardware pairing. After hardware pairing has been deconfigured resulting in a system architecture such as depicted in FIG. 4B, the application is dispatched with a second number of threads. In one embodiment, this is a larger number of parallel threads. In another embodiment, the same or fewer threads are scheduled, making additional threads available to other applications, or de-energizing unused threads for power conservation. After parallel computation of the resilient application portion 304, another barrier sync is performed. After barrier synchronization, in code portion 306 there include call-outs to reconfigure the system to use hardware-resilient paired cores is performed, and the less intrinsically resilient application portion 306 is performed.

In one embodiment, the system and method provides for the scheduling of application threads executing on a first hardware-resilient paired core, and on a second application-resilient non-paired core. In one embodiment, the operating system implements a variety of scheduling algorithms. In accordance with one exemplary scheduling algorithm, execution time on a paired core and on an unpaired core are equally weighted in accounting and scheduling priority decisions. In another exemplary scheduling algorithm, execution time on a paired core and on an unpaired core are weighed at different weights, e.g., assigning a half-second of execution time on a paired core the same relative weight as a second of execution time on an unpaired core to reflect different resource cost. In accordance with one embodiment, cumulative runtime is computed as follows:

```
if (thread_type == reliable_thread)
    cumulative_runtime += runtime * 2;
else
    cumulative_runtime += runtime * 1;
```

Those skilled in the art will understand how to apply other weight ratios for execution time in accordance with the teachings herein.

Figure 6:
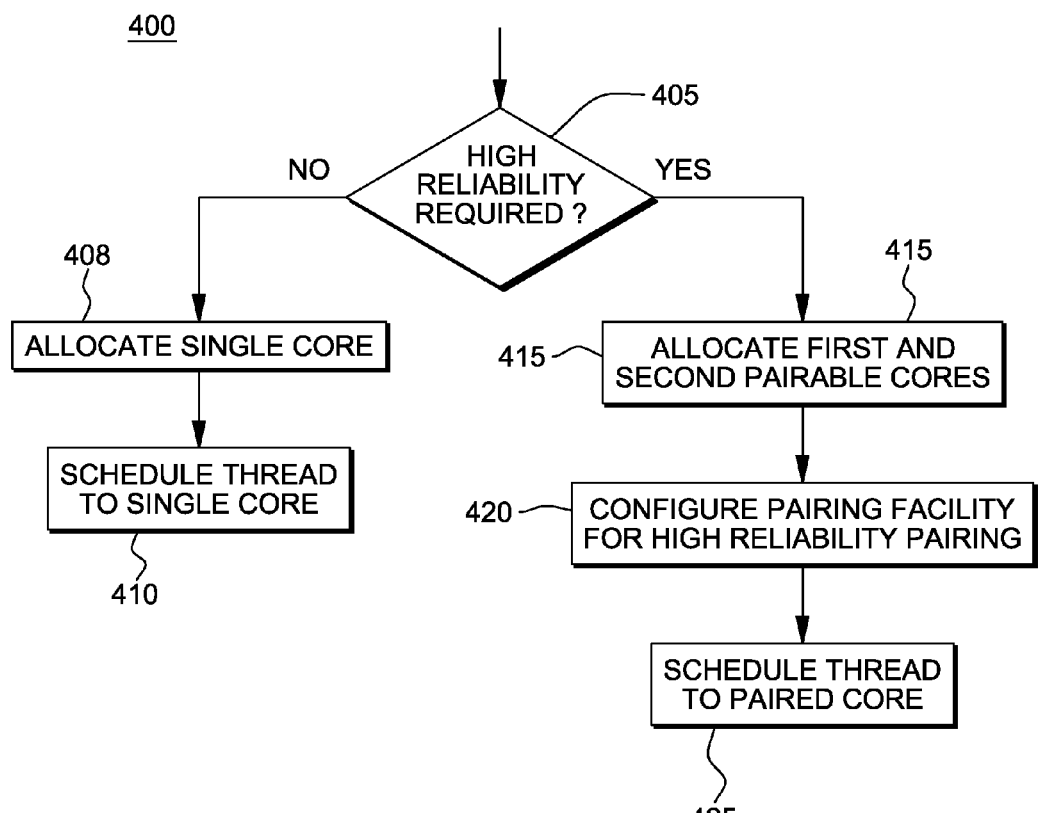
FIG. 6 depicts an example methodology 400 performed by the scheduler component of the multiprocessor system or IC, for configuring the system in accordance with thread reliability requirements according to one embodiment.

FIG. 6 depicts an example methodology 400 performed by the scheduler component of the multiprocessor system or IC, for configuring the system in accordance with thread reliability requirements, e.g., as indicated by the code portions such as shown in FIG. 5. At 405, there is depicted evaluation of a programmed call-out to determine if the current code portion being run requires a highly-reliable paired mode of operation. If highly-reliable paired mode of operation is not required for a current code portion, for instance, as may be detected in code portions 304 or 308 of FIG. 5, a scheduler providing configuration information will only allocate a single core to execute that code portion and schedule a thread to perform that code at the allocated single core at 410 configured for throughput optimized mode. In accordance with one aspect, a core group configured for reliable operation with pairing is reconfigured to provide multiple cores optimized for throughput optimized execution when cores with throughput-optimized are unavailable.

Otherwise, at 405, if it is determined that the current code portion being run requires a highly-reliable paired mode of operation, for instance, as may be detected in code portions 302 or 306 of FIG. 5, then at 415, the scheduler will allocate first and second pairable cores and, at 420, configure the pairing facility for simultaneous highly reliable pairwise operation and further at 425, schedule the thread to operate at the paired core.

Figure 7:
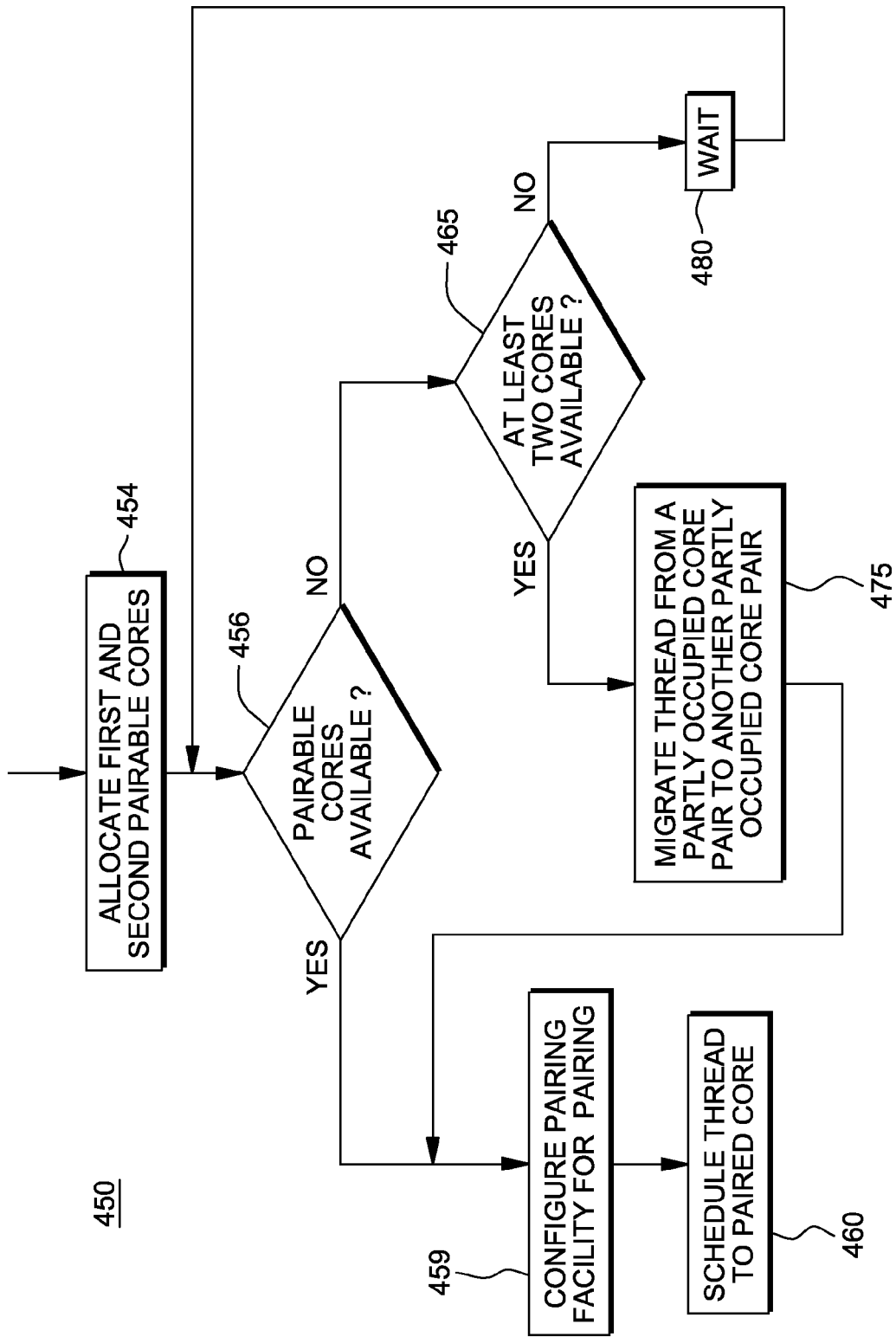
FIG. 7 depicts an example methodology 450 performed by the scheduler component of the multiprocessor system or IC, for configuring the system in accordance with thread reliability requirements according to a further embodiment.

More particularly, FIG. 7 depicts an example methodology 450 performed by the scheduler component of the multiprocessor system or IC, for configuring the system in accordance with high-reliability thread reliability requirements according to one embodiment. As shown in FIG. 7, scheduler component 98 (FIG. 3A) (or scheduler component 76 (FIG. 3B))

generates signals to configure allocating of a processing thread on first and second paired processor cores for running high reliability mode operations. That is, at step 454, to configure one or the other mode of operation, e.g., by a system operator, or autonomically by the operating system, responsive to an software application indication requesting specific configuration, the scheduler initiates the allocation of first and second pairable cores. This involves determining, at 456, whether first and second pairable cores are available. If at 456, it is determined that the pairable cores are available, then the available pairing facility is configured for high-reliable operations as depicted at step 459 such that a single processing thread may be scheduled for pairwise execution at first and second pairable cores at 460.

Otherwise, returning to step 456, it is determined that pairable cores are not available (at a single pairing facility), a determination is made as to whether at least two processor cores of the computing system are available at 465 (e.g., each processor core being associated with separate pairing facility). If it is determined at 465 that at least two cores are available, then at 475, a throughput-optimized thread running on one of the cores (e.g., of a first pairing facility) is selected and scheduled for migration from that core to another processor core (e.g., of a separate or another partly occupied pairing facility). Once migrated, this effectively frees up a processor core pair on the first pairing facility which can now be configured for high-reliable operations, e.g., for thread pairwise execution in accordance with the invention. Thus, once the prior process is migrated, by returning to step 459, the scheduler may initiate configuring first and second pairable cores for pairwise execution in the manner as described herein. Otherwise, returning to step 465, if the scheduler determines at least two processor cores of the computing system are not available, the system waits at 480 until pairable cores are available as set forth at step 456. Those skilled in the art will understand that instead of waiting for a core to become available at step 480, an alternative embodiment can also implement descheduling of a throughput-optimized thread from at least one core, in order to make two processor cores available.

Those skilled in art will understand that scheduler component 98, or scheduler component 76 can be implemented in a variety of ways. In one embodiment, the scheduler component will be implemented as microprocessor executing instructions corresponding to the scheduling methods in accordance with the present inventions. In one embodiment, the microprocessor is one or more of processors 12a . . . 12n. In another embodiment, a separate processor for executing scheduling decisions is provided. In one embodiment, a customized hardware component implementing the methods used herein is used.

Those skilled in the art will understand that selection of reliability-optimized or throughput-optimized threads can occur in a variety of ways. In one embodiment, an operator can indicate high reliability operation for a set of specific programs in a configuration file, or at program start time. This will be particularly useful for legacy programs not equipped to configure execution modes. In another aspect, an application program selects different execution modes for different program regions. In accordance with another embodiment, an operator can specify to ignore mode selections made by a program. This will be particularly useful when a program equipped to select operating modes is known to be faulty and to be selecting modes inappropriately.

Figure 8A:
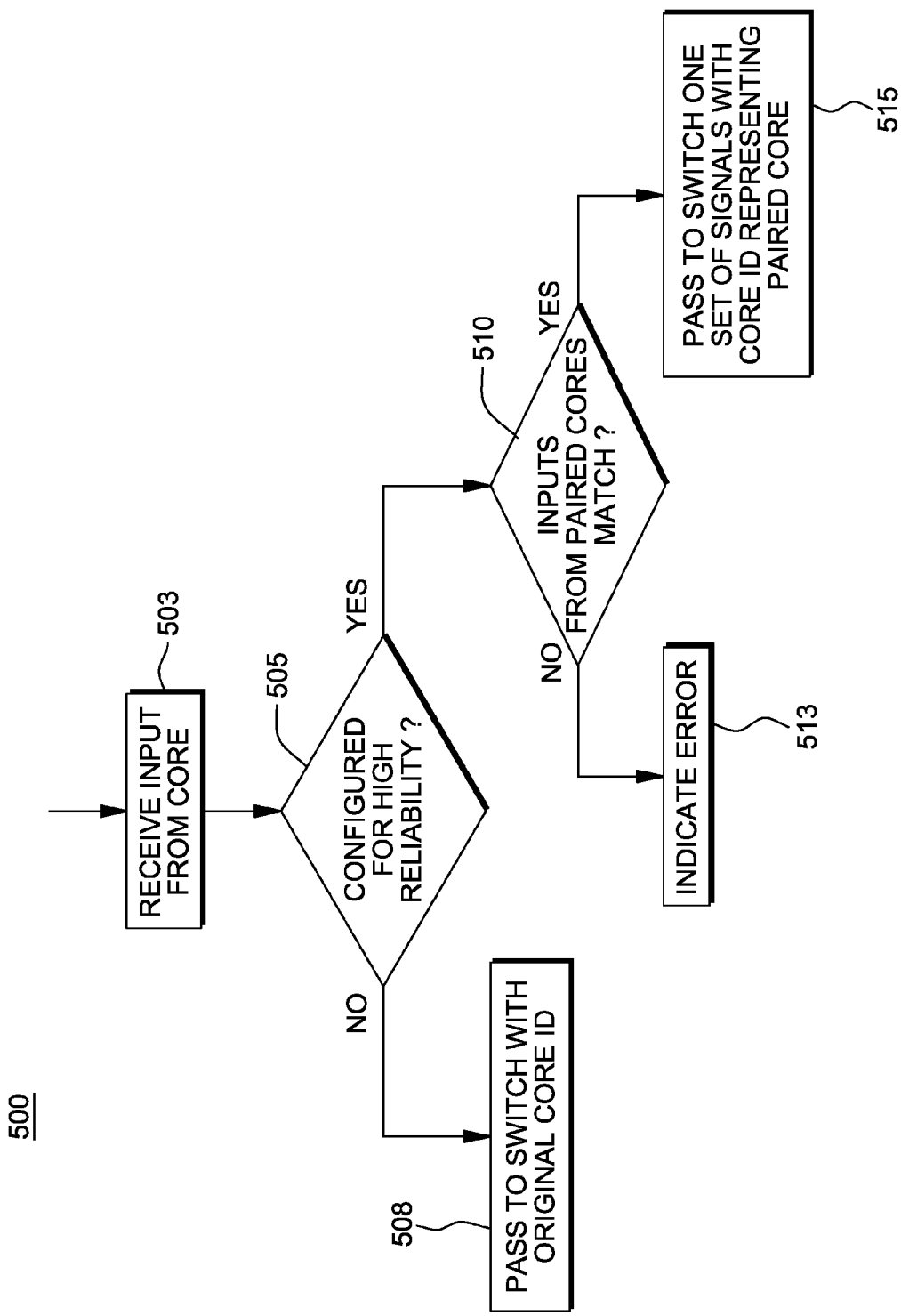
FIG. 8A depicts a methodology 500 employed at the pairing facility with reliability checking in response to receipt of data from a microprocessor according to one embodiment.

FIG. 8A depicts a methodology 500 employed at the pairing facility with reliability checking in response to receipt of data from a microprocessor. At step 503, there is depicted the receipt at the pairing facility of data from a microprocessor core. At 505, a determination is made as to whether the microprocessor core has been configured for paired mode of operation (high reliability). If at 505 it is determined that the microprocessor core has not been configured for paired mode of operation, then the pairing facility is configured according to facility 101a shown in FIG. 4B. Thus, as shown at 508, the original core ID of the processor from which the data is provided is passed to the switch with the data at the pairing facility, for example, such that the data is passed through the facility to a switch or the system "nest", without checking by a paired ("checker") processor.

Otherwise, if at 505, it is determined that the microprocessor core has been configured for high reliability (i.e., paired mode of operation), then the pairing facility is configured according to facility 101a shown in FIG. 4C. In this example, for instance, data comprises processing results sent from processor 12a, for example, received from line 125a (shown in FIG. 4C). However, in this highly reliable mode of operation, as shown at 510, a determination is then made as to whether the inputs from the paired core match. That is, in view of FIG. 4C selective pairing configuration for high reliability, it would be determined by comparator 275 (of FIG. 4C) whether the data comprising processing results of the paired processor device 12b, for example, received at line 125b matches the data received at the facility from processor 12a along line 125a at the pairing facility. If at step 510 it is determined that the data input from its paired core 12b does not match the result data being input from the processor core 12a, then a compare result error is flagged at 513 indicating a potential hardware failure at one of the cores. In this scenario, the error is generated as error signal 280 (FIG. 4C) which is further processed by the configuration logic at the paired facility for further action. In one embodiment, this error initiates an interrupt routine. For example, in one embodiment, it can not be determined which core has an error, only that an error occurred; and since as the correct result is not known, the result is discarded. Otherwise, if at step 510 it is determined that the data input from its paired core 12b does match the result data being input from the processor core 12a, then at 515, one set of signals (e.g., data) is passed through the facility to the switch or the system "nest" with a core ID representing the paired cores.

Figure 8B:
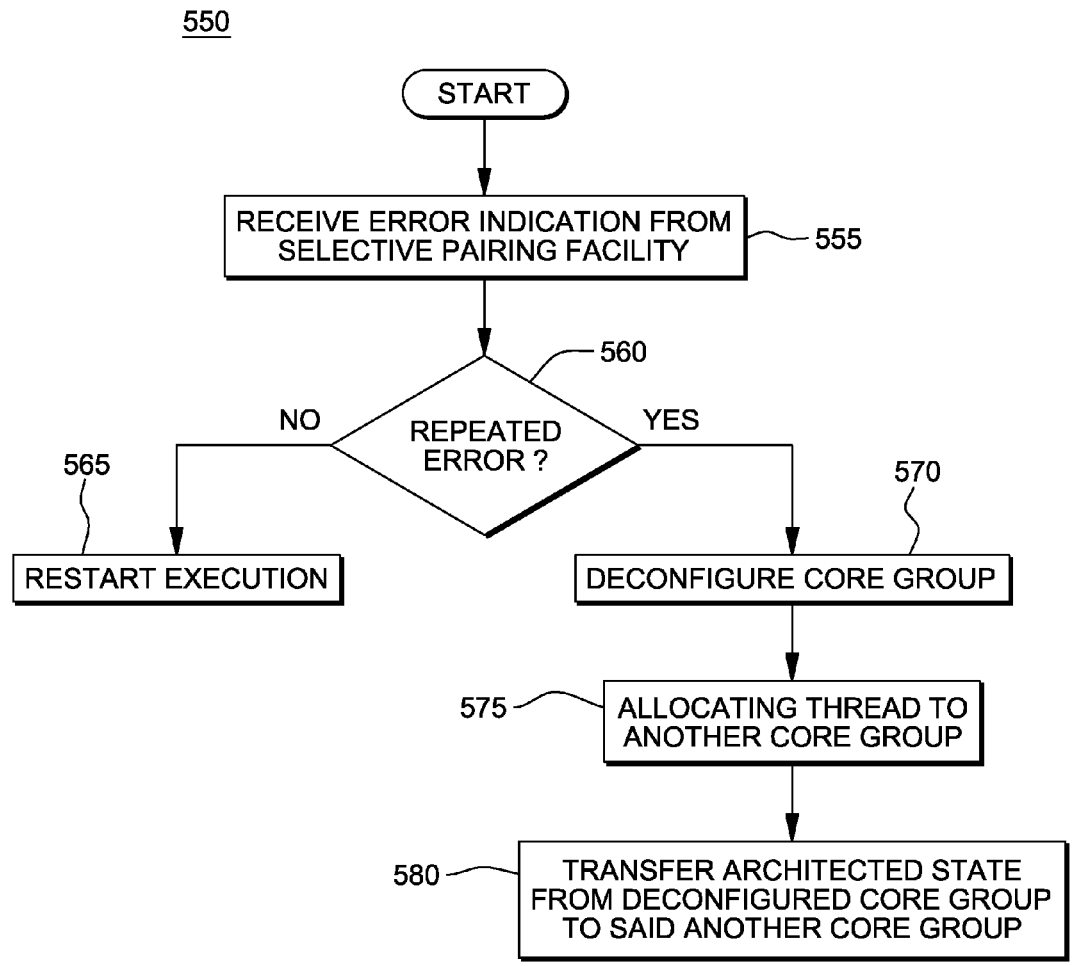
FIG. 8B depicts a method 550 for handling of an error indication in accordance with step 513 of FIG. 8A.

FIG. 8B depicts a method 550 for handling of an error indication in accordance with step 513 of FIG. 8A. In Step 555, an error indication is received by the scheduling method or component. The indication can be received by one of an external processor exception, and external processor interrupt, by polling an external status register, or by reading an internal status register connected to a hardware signal 280. In step 560, a test is performed to determine whether the detected hardware error corresponds to a repeat error (e.g., resulted after repeating a second run of the pairwise lock-step execution of the thread). If the test result is negative (not a repeat error), the scheduling component restarts execution in step 565 at the same selective pairing facility. In accordance with one embodiment, execution is restarted from an application-generated checkpoint. In accordance with another embodiment, execution is restarted by way of a recovery mechanism exploiting a transaction-based execution facility present in microprocessor core 12a . . . 12n. In another embodiment, when neither application-generated checkpoints nor transaction-based recovery mechanisms are available, execution of the application is terminated.

Otherwise, if at step 560, it is determined that the detected hardware error is a repeat error, the process proceeds to step 570 where a group of cores associated with a selective pairing facility are deconfigured when repeated errors have been received, e.g., to isolate a defective or failing component. In step 575, a thread previously allocated to the group of processor core and selective pairing facility from which repeated errors have been received is allocated to another group of processor cores corresponding to another selective pairing facility. In step 580, the scheduler transfers the architected state (i.e., all processor registers and other architected state information, such as the program counter and configuration registers) from the deconfigured core group to the newly allocated core group.

Figure 9:
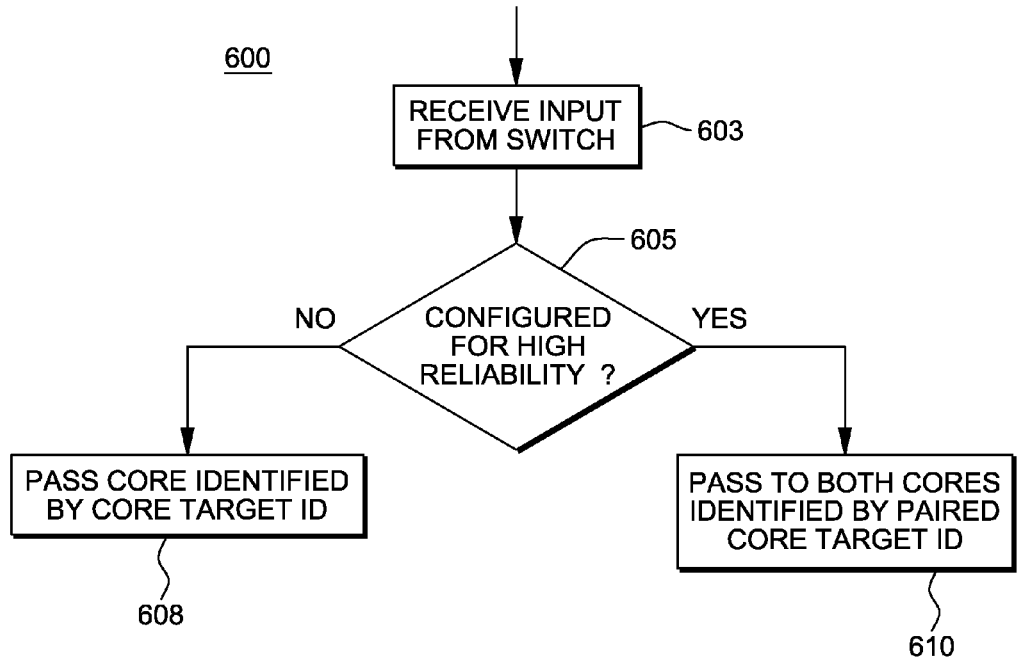
FIG. 9 depicts a methodology 600 employed at the pairing facility with reliability checking in response to receipt of data from the system nest via the switch/bus according to one embodiment.

FIG. 9 depicts a methodology 600 employed at the pairing facility with reliability checking in response to receipt of data from the system nest, e.g., via the switch/bus according to one embodiment. At step 603, there is depicted the receipt at the pairing facility of data from the switch/bus. At 605, a determination is made as to whether the system is configured for highly reliable (paired) mode. If the system is not configured for highly reliable (paired) mode, then the pairing facility is configured according to facility 101a shown in FIG. 4B. In this instance, at 608, the received (input) data from the system "nest" is passed directly to the processor core, e.g., core 12a, identified by the core target ID via signal line 120a for input to processor core 12a. Otherwise, if at 605, it is determined that the microprocessor core has been configured for high reliability (i.e., paired mode of operation), then the pairing facility is configured according to facility 101a shown in FIG. 4C. In this mode of operation, for instance, data received from system "nest", for example, received at line 120a (shown in FIG. 4C) is input to both paired processor cores 12a, 12b identified by a paired core ID. That is, in such an embodiment, as indicated at 610, FIG. 9, control signals are generated to configure the mux element 250 to additionally receive and select (pass through) to paired processor core 12b those received signals received for processor core 12a according to a paired core target ID.

Figure 10:
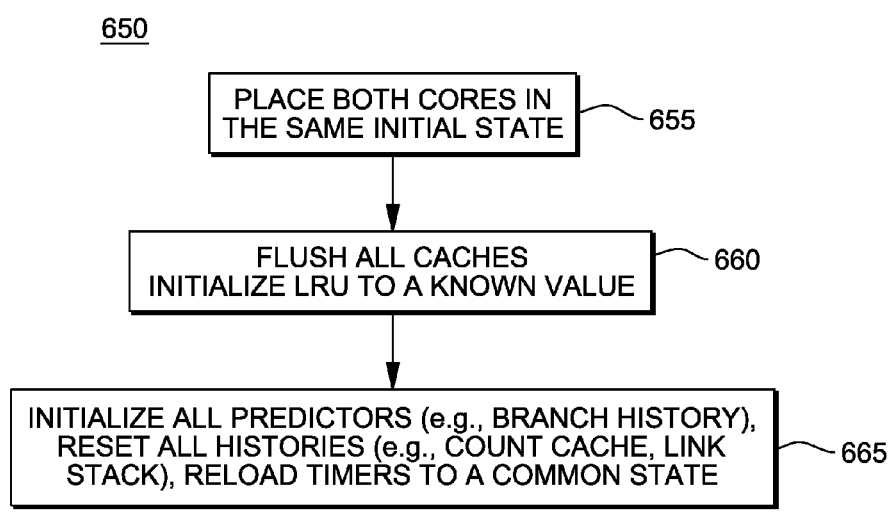
FIG. 10 depicts a method 650 of configuring of the paired cores for a checker/checkee relationship in order to ensure lockstep execution on a cycle-by-cycle basis in one embodiment.

In one aspect of the invention, configuring of the paired cores for a checker/checkee relationship as described herein, requires initialization of both cores in a common microarchitectural state in order to ensure lockstep execution on a cycle-by-cycle basis. In one embodiment, as shown in FIG. 10, a method 650 of rendering the pairing facility and selected paired cores for a checker/checkee relationship include, but not limited to: the following steps: 1) placing both cores in same initial state to have exactly same execution sequence at 655; 2) flushing all cache state and initialize LRU (Least Recently Used) information to a known value at 660; and, 3) initiating, at 665, all predictors to a common state which may include branch history, count cache, link stack, a reset of all histories; a reloading of timers, etc. In one aspect, this initialization for paired core operations can be performed by a code sequence, or micro-code, a combination of ABIST and state machines. In one embodiment, ABIST and state machines are used as advantageously not having side effects (e.g., warming up predictor); and, 4) starting execution at same time, e.g., via a common external exception.

It should be understood that the principles of the invention described herein are equally applicable to the both configuring and de-configuring of paired cores, responsive to a system operator (e.g., the partitioning of high reliability and higher performance cores is performed under control of a system operator, and fixed for the duration of execution until a next operator reconfiguration), responsive to an application indication requesting specific configuration, or autonomically by the operating system.

In one multiple processing chip embodiment having a plurality of cores, it is understood that there are many types of processors/cores which may be used or even required for different applications, e.g., processors with accelerators, processors without acceleration, processors dedicated for handling cryptographic operations, protocol conversion, etc. However, selective core pairing facility, whether initiated by an operator, explicit program call-outs, or as determined by a compiler, is responsive to the configuration instructions received, and in the paired mode, the selected paired hardware cores and data/bus configurations to each of those cores are matched, i.e., are identical, for the fault tolerant operations.

FIG. 11 illustrates an exemplary hardware configuration of a computing system 700 running and/or implementing the method steps described herein. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A method for performing operations in a multiprocessing system comprising a plurality of processor cores, said method comprising:
    dynamically configuring a selective pairing facility to communicate with at least two processor cores for performing one of: independent parallel operation or highly-reliable fault tolerant operations;
    scheduling, by a scheduler device operatively connected with said selective pairing facility, software-resilient threads to said at least two processor cores when the selective pairing facility is configured for said independent operation of said at least two cores, said scheduler device generating first configuration signals for receipt at said selective pairing facility to configure a first operating mode wherein processor cores connected to said selective pairing facility execute independent threads;
    scheduling, by said scheduler device, hardware-resilient threads to said at least two processor cores connected to said selective pairing facility when the selective pairing facility is configured for said highly-reliable fault tolerant operations, said selective pairing facility providing simultaneous pairwise execution of a thread at paired first and second processor cores, said scheduler device generating second configuration signals for receipt at said selective pairing facility to configure a second operating mode wherein said first and second processor cores connected to said selective pairing facility are configured to operate on the same instruction and data for a single thread, and the selective pairing facility is configured to perform error checking by
    checking execution results generated by said paired first and a second processor cores in order to detect incorrect execution sequences; and
    reconfiguring said selective pairing facility operating in said first operating mode to operate in said second mode by migrating a software-resilient thread from a first processor core running at a first selective pairing facility configured in said first operating mode to a second processor core corresponding to a second selective pairing facility configured to operate in said first operating mode thereby rendering a pair of processor cores available to receive a thread for said highly reliable fault tolerant operations at said first selective pairing facility.

2. The method as in claim 1, further comprising: receiving, at said scheduler device, an indication that a thread is one of a software-resilient and hardware-resilient thread.

3. The method as in claim 2, wherein said received indication is sourced from one of an operator, a configuration file, an application program and an autonomic operating system component.

4. The method of claim 2 further comprising:
reconfiguring said selective pairing facility operating in said second operating mode to operate in said first mode.

5. The method of claim 4 further comprising: descheduling at least one thread from at least one processor core when a selective pairing facility is to be reconfigured from one mode to another mode.

6. The method as in claim 1 wherein, responsive to said checking execution results generated by said paired first and a second processor cores, said method further comprising: generating an error indication at said selective pairing facility operating in said second operating mode indicating that the results computed by said cores connected to said selective pairing facility are different.

7. The method as in claim 6 further comprising one of: aborting execution of a program and restarting execution of said program from a prior stored checkpoint.

8. The method as in claim 6 wherein one of said at least two processing cores has an associated transactional memory system, said method further comprising: aborting a transaction and restarting execution of a transaction corresponding to said generated error indication.

9. The method as in claim 8 further comprising: deconfiguring said selective pairing facility and its operating processor cores in response to a recurring error indication.

10. The method as in claim 9 further comprising: descheduling of at least one hardware-resilient thread from said deconfigured selective pairing facility and its corresponding processor cores, and scheduling said hardware-resilient thread to another selective pairing facility and its corresponding processor cores.

11. The method of claim 9 further comprising: reading a state of the processor core in a deconfigured processor core corresponding to a deconfigured pairing facility, and transferring said processor state to said processor cores of said another selective pairing facility.

12. A multiprocessing computer system comprising:
a memory system including a memory storage device;
at least two processor cores in communication with said memory system;
a scheduler device generating first and second signals comprising first and second configuration information, respectively, for controlling allocation of processing threads to available processing cores;
a pairing sub-system adapted to dynamically configure two of said at least two processor cores for independent parallel operation in response to receipt of said first configuration information signals, said pairing sub-system providing at least two separate signal I/O paths between said memory system and each respective one of said at least two processor cores for said independent parallel operation,
said pairing sub-system adapted to pair at least two of said at least two processor cores for fault tolerant operations in response to receipt of said second configuration information signals, said pairing sub-system providing a common signal path for forwarding identical input data to each said paired two processor cores for simultaneous processing thereat; and,
decision logic device, in said pairing sub-system, for receiving an output of each said paired two processor devices and comparing respective output results of each, said decision logic device generating error indication upon detection of non-matching output results,
wherein said scheduler device determines whether a single core or a paired core is to be allocated at said pairing sub-system, and schedules a single thread to run on said single core or said paired core when configured for highly reliable fault tolerant operations, and
responsive to determining a thread is to run on a paired core, said scheduler device determining availability of two processor cores at a first pairing sub-system; and upon determining only a single available processor core at said first pairing sub-system, said scheduler device dynamically scheduling migration of a processing thread running at a processing core of said first pairing sub-system to an available processing core of a second pairing sub-system, thereby rendering a pair of processor cores available to receive a thread for said highly reliable fault tolerant operations at said first pairing sub-system.

13. The multiprocessing system as in claim 12 wherein subsequent to migrating a processing thread running at said processing core of said first pairing sub-system to an available processing core of said second pairing sub-system, said scheduler device initiating configuration of each said paired core at said first pairing sub-system for performing simultaneous pairwise lockstep execution, said simultaneous lockstep execution includes configuring each of said paired cores in a common microarchitectural state to ensure said lockstep execution on a cycle-by-cycle basis.

14. A computer program product for performing operations in a multiprocessing system comprising a plurality of processor cores, the computer program product comprising a storage medium readable by a processing circuit and storing instructions run by the processing circuit for performing a method, the method comprising:
dynamically configuring a selective pairing facility to communicate with at least two processor cores for performing one of: independent parallel operation or highly-reliable fault tolerant operations;
scheduling, by a scheduler device operatively connected with said selective pairing facility, software-resilient threads to said at least two processor cores when the selective pairing facility is configured for said independent operation of said at least two cores, said scheduler device generating first configuration signals for receipt at said selective pairing facility to configure a first operating mode wherein processor cores connected to said selective pairing facility execute independent threads;
scheduling, by said scheduler device, hardware-resilient threads to said at least two processor cores connected to said selective pairing facility when the selective pairing facility is configured for said highly-reliable fault tolerant operations, said selective pairing facility providing simultaneous pairwise execution of a thread at paired first and second processor cores, said scheduler device generating second configuration signals for receipt at said selective pairing facility to configure a second operating mode wherein said first and second processor cores connected to said selective pairing facility are configured to operate on the same instruction and data for a single thread, and the selective pairing facility is configured to perform error checking by
checking execution results generated by said paired first and a second processor cores in order to detect incorrect execution sequences; and
reconfiguring said selective pairing facility operating in said first operating mode to operate in said second mode by migrating a software-resilient thread from a first processor core running at a first selective pairing facility configured in said first operating mode to a second processor core corresponding to a second selective pairing facility configured to operate in said first operating mode thereby rendering a pair of processor cores available to receive a thread for said highly reliable fault tolerant operations at said first selective pairing facility.

15. The computer program product as in claim 14 wherein said method further comprises: receiving, at said scheduler device, an indication that a thread is one of a software-resilient and hardware-resilient thread, wherein said received indication is sourced from one of an operator, a configuration file, an application program and an autonomic operating system component.

16. The computer program product as in claim 15 wherein said method further comprises:
  reconfiguring said selective pairing facility operating in said second operating mode to operate in said first mode.

* * * * *